United States Patent [19]

Bouy et al.

[11] 4,135,996

[45] Jan. 23, 1979

[54] SELECTIVE DIAPHRAGM FOR ELECTROLYSIS

[75] Inventors: Pierre Bouy, Enghien-les-Bains; Jean Bachot, Fontenay-aux-Roses; Jean-Luc Bourgeois, Paris, all of France

[73] Assignee: Rhone-Poulenc Industries, Paris, France

[21] Appl. No.: 742,570

[22] Filed: Nov. 17, 1976

[30] Foreign Application Priority Data

Nov. 21, 1975 [FR] France .................................. 75 35627

[51] Int. Cl.² ........................ C25B 1/46; C25B 13/08; C25B 13/02
[52] U.S. Cl. ..................................... 204/98; 204/252; 204/296
[58] Field of Search .................. 204/296, 98, 252–266

[56] References Cited

U.S. PATENT DOCUMENTS

| 3,562,139 | 2/1971 | Leitz ..................................... 204/296 |
| 3,799,743 | 3/1974 | Alexander et al. .............. 204/296 X |
| 3,887,499 | 6/1975 | Hodgdon .......................... 204/296 X |
| 3,930,979 | 1/1976 | Vallance ............................. 204/252 |
| 4,003,818 | 1/1977 | Juillard et al. ........................ 204/296 |

*Primary Examiner*—F.C. Edmundson

[57] ABSTRACT

A selective composite diaphragm is provided comprising a ion-exchange membrane having at least one microporous layer joined to it, whereby the microporous layer is of high, homogeneous porosity and is preferably at least as thick as the membrane. Said diaphragm is particularly useful for electrolysis of sodium chloride, enabling pure concentrated alkaline solution to be obtained with a high yield.

15 Claims, No Drawings

SELECTIVE DIAPHRAGM FOR ELECTROLYSIS

BACKGROUND OF THE INVENTION

The invention concerns a selective composite diaphragm for electrolytic cells, which provides an improvement in the operating conditions of the cells.

Cells fitted with a porous diaphragm which separates the anode and cathode compartments have long been used in electrolysis. In such cells the phenomena of movement by diffusion, convection, percolation, and electro-migration cause uncontrollable transference of ions, leading to pollution of the effluent solutions. The concentrations of solutes in these solutions are limited and the yields are poor. Particularly in the case of electrolysis of brines for the preparation of chlorine and sodium, the sodium solutions obtained are polluted by salts and, in addition, are relatively dilute.

The use of ion-exchange membranes, with selectivity to the passage of cations or anions, in electrolytic cells has also been proposed. It is thus theoretically possible to avoid certain migrations of ions from one compartment of a cell to another by such membranes. In practice, the migration of ions which are subjected to the action of the magnetic field is only imperfectly controlled. In electrolysis of sodium chloride solutions with a cationic membrane, for example, as soon as the concentration of soda in the cathode compartment reaches a certain level, hydroxide ions pass to the anode compartment, thereby reducing the yield.

It is also difficult to find membranes which show satisfactory resistance to the chemical actions and mechanical stresses to which they are subjected and which, at the same time, show the desired selectivity in respect of the ions, at least in a concentrated medium.

It has been proposed to overcome these various difficulties by using cells with a plurality of compartments, particularly separated by partitions comprising at least one diaphragm and one membrane, each of such partitions separating two adjacent compartments. Apart from the obvious complexity of the cells, this results in a marked increase in the voltage requirement and in the obtaining of dilute solutions in most cases. Methods of electrolysis carried out in cells fitted with a diaphragm which is obtained by treating a diaphragm based on asbestos with an ion exchange resin which will react on asbestos have also been described. However, the concentrations of soda obtained are low and the solution obtained is polluted.

A new diaphragm has now been found which avoids the various disadvantages mentioned above. When, for example, it is used in electrolytic preparation of chlorine and soda, it enables pure, concentrated solutions of soda to be obtained with a high faradaic yield and also shows good resistance to corrosion and mechanical stresses.

It is, accordingly, an object of the present invention to provide a novel electrolytic cell and diaphragm which avoids the disadvantages of the prior art.

It is also an object of the present invention to provide an electrolytic cell having a diaphragm which enables one to provide substantially pure concentrated solutions of soda.

Other objects of the invention will be apparent to those skilled in the art from the present description.

GENERAL DESCRIPTION OF THE INVENTION

The selective diaphragm for electrolytic cells according to the invention comprises an ion exchange membrane having at least one microporous layer joined to it. Various ion exchange membranes may be used, the choice of membrane depending on the purpose of the operation.

Some of the cation-exchange membranes are those formed from organic, e.g., phenol-formaldehyde, resins or obtained by polymerization of styrene and/or divinylbenzene, fluorocarbon resins, polysulphones or polymethacrylic or phenoxy resins, with cation exchanging radicals, such as $-SO_3H$, $-COOH$, $-PO_2H_2$, $-PO_3H_2$, $-As\ O_3H_2$, $-Se\ O_3H$, and $-Ph\ OH$ fixed to them (Ph being an aromatic nucleus). Such resins may be employed as mixtures or modified and, for example, fluorocarbon resins may comprise substituted or unsubstituted alkoxy groups and contain elements such as sulphur, nitrogen and oxygen. Other examples are membranes containing inorganic ion exchangers such as zirconium, titanium or chromium phosphates or polyphosphates. These various membranes are of variable durability in an electrolytic bath. Generally speaking, resins with sulphonic groups are preferred and among these polyfluorocarbon resins, such as those described particularly in British Pat. No. 1,184,321, have proved particularly satisfactory.

The invention could be adapted to other purposes by using an anion exchange membrane in place of a cation exchange membrane. Some examples of the anion exchange membranes are membranes based on organic resins, such as phenol-formaldehyde resins, or resins with a fluorocarbon skeleton carrying anion exchange groups, polymers with quaternary ammonium groups or inorganic material such as zirconium or cerium hydroxides.

The nature of the microporous layers may equally vary greatly and depends particularly on the type of electrolysis carried out. It is necessary in particular for them to have good physical properties in order to resist the stresses to which they are subjected, particularly during handling, and good chemical resistance vis-a-vis the constituents of the electrolytic bath.

The material forming these layers may be based on a wide variety of organic polymers, particularly fluorocarbon or polyvinyl polymers, or organic or inorganic gels, such as those of silica, alumina, titanium oxide or thorium, silica aluminate or various phosphates. Layers or porous diaphragms based on asbestos and polytetrafluoroethylene are generally preferred. Among the latter which may be employed are those of U.S. Pat. No. 3,980,613, granted Sept. 14, 1976 and applications for U.S. patents, Bouy et al. U.S. Pat. No. 4,031,041, and Juillard et al. U.S. Pat. No. 4,003,818, granted Jan. 18, 1977, both and commonly assigned.

These materials are given a specific porosity, again in known manner, either by adding pore-forming agents and then eliminating them after molding or, e.g, in the case of gels, by eliminating one constituent such as water or an alcohol. The aforementioned U.S. patent and applications for patent disclose suitable methods for pore-forming. The porosity $\epsilon$, defined by the ratio of the volume of pores to the total volume, may vary within broad limits, i.e., from about 0.05 to 0.95:1. A reduction in porosity is known to bring an increase in the voltage drop across the diaphragm, while an increase in porosity reduces mechanical strength. The preferred porosity is generally from about 0.7 to 0.9:1.

The part played by the diameter of the pores has still not been satisfactorily explained. Experiments show that the best results are obtained with the finest pores, if the viscosity of the liquid passing through the porous layer is low enough to prevent any substantial deceleration of its passage through the pores. The diameter of the pores may vary from about 0.01 to 30 microns although diameters of about 0.2 to 5 microns are generally preferred. This is a hydraulic diameter, that is to say, the diameter of a cylindrical pore which would have the same effect on fluid flow as the actual pore considered.

The thickness e of the microporous layer has a function similar to that of porosity. In electrolysis, the linear speed of water in the pores of the layer is also an important factor. This speed V, the thickness e, and the porosity $\epsilon$, are linked by the formula $V = J/\epsilon e$ where J is the flow of water per unit of area.

These layers are chosen so that the ratio of their electrical resistance R to the resistance of an identical thickness of electrolytic bath Ro satisfies the relationship $1.5 < (R/Ro) < 10$. The various factors mentioned and particularly the thickness of the microporous layer are, therefore, selected so as to satisfy this relationship.

The choice of the thickness of the microporous layer is dictated by a different consideration. It has, in fact, been observed that the flux of hydroxide ions is controlled by the ion exchange membrane and particularly by the diffusion layers which are present at the surface of the membrane. Now the thickness of these layers is bound up with the state of agitation of the bath in the vicinity of the membrane. It has been found that porous layers are capable of stabilizing the diffusion and providing the desired properties of concentration. In addition, since the electrical resistance of the membrane and of the porous layers is additive, only layers of high, homogeneous porosity are appropriate. Virtually perfectly homogeneous porosity, in particular, enables layers of a certain thickness to be used without any disadvantages. By virtue of their thickness, they have good mechanical strength, such that the strength of the unit forming the composite diaphragm is highly satisfactory. It is advantageous for the thickness of the layers to be at least equal to and preferably greater than that of the membrane.

It is essential that the microporous layer or layers and the membrane should be joined to one another on their largest surfaces. The association between them may be obtained in many different ways, which are generally well known. The components of the composite diaphragm may be produced separately then joined by pressing, calendering, adhesion, etc. The membrane may equally be prepared first, a gel can be deposited by coating or by precipitation onto the immersed membrane, and the solvent or water can then be eliminated. Coating, projecting a mixture of inert constituent and pore-forming agent or dipping the membrane into such a mixture is another possible method which includes the subsequent phase of removing the pore-forming agent. Similarly, a microporous layer may be prepared first and the ion exchange membrane formed on at least one of its surfaces by a known method. An explanation of the special effect obtained through the presence of a membrane and at least one microporous layer in close contact can be offered, although this explanation in no way changes the legal scope of the invention as claimed below. It is, in fact, probable that a profile of stationary concentration of ions and molecules is set up in the microporous layer by the action of the electric field, and the gradients of concentrations, such as the concentrations in the vicinity of the membrane, are probably different from what they would be without the additional layer. As was explained above, the theory concerning the operation of ion exchange membranes is known to depend on the existence of fine diffusion layers at the surface of the membranes. The thickness of these layers varies greatly in electrolytic cells due to agitations of various origin created in the electrolyte. The presence of microporous layers enables this variation in thickness to be controlled. The combination of these effects is probably at least one of the reasons for the advantages provided by the diaphragm according to the invention; these advantages have been mentioned above and will be illustrated by these examples.

A microporous layer may be provided on the side of the membrane facing towards either the anode or the cathode. A layer may equally be applied to each of these sides.

A particularly important application of the diaphragm according to the invention is its use in the preparation of soda and chlorine by electrolysis. In addition to the advantages which have been emphasized in another connection, it has been found in particular that membranes which cannot be used in such electrolysis due to corrosion are resistant to such corrosion when joined with at least one microporous layer which it itself substantially inert. Other electrolytic processes in which migration of certain ions has to be avoided may advantageously be carried out with such a diaphragm.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In these examples which follow, and throughout the specification, the quantities of material are expressed in terms of parts by weight, unless otherwise specified.

EXAMPLE 1

A cation exchange membrane consisting of a sulphonated fluorocarbon polymer comprising active sulphonated groups (DuPont trademark NAFION XR 315) is joined to a microporous sheet 0.9 mm. thick with 80% porosity and pores of an average diameter of 0.3 micron (hydraulic diameter). The sheet is obtained from a mixture of the following composition:

1.8 part of polytetrafluoroethylene latex (trademark SOREFLON) with 60% dry extract 0.4 part asbestos (fiber of the trade name ASARCO 5R4)

5 parts of calcium carbonate, calibrite 14 grade, (trademark OMYA)

0.04 part of dodecylbenzenesulphonic acid

The mixture is put into sheet form by calendering, then dried and sintered under the conditions described in Belgian Pat. No. 831,963.

The resultant sheet is then applied to the ion exchange membrane. For this purpose it is kept in an electric press on the preheated membrane for 6 minutes at 220° C., then for another 4 minutes at a pressure of 4 kg./cm.$^2$.

The composite unit formed is then immersed for 48 hours in a 20% by weight aqueous solution of acetic acid, degassed under reduced pressure in water and kept moist until it is used.

It is then mounted vertically in an electrolytic cell with a cross-section of 1 cm.$^2$ between the two electrodes. The microporous sheet faces towards the anode, which consists of a titanium grid covered with a platinum-iridium alloy. The cathode is an iron grid. The distance between the two electrodes is 7 mm.

The anode compartment thus formed is supplied with a brine containing 295 g./l. of NaCl at a rate of 270 ml./hr; the cathode compartment has been previously filled with water which is made conductive with a small quantity of soda (20 g./l.).

A current of 25 amperes is passed between the electrodes. In the normal working state (after 48 hours) the potential difference between the electrodes is 4.5 volts. The temperature of the bath is 85° C. A 420 g./l. soda solution is collected, containing less than 0.1 g./l. of NaCl and no chlorate that can be revealed by chemical analysis. Yield = 73%.

COMPARATIVE EXAMPLE 1a

In the same cell as that in Example 1, above, but fitted solely with the ion exchange membrane instead of the composite diaphragm, the anode compartment is supplied with a sodium chloride brine containing 295 g./l. at a rate of 700 ml./h. A current strength of 25 amperes is maintained. After 48 hours the potential difference between electrodes is 5.5 volts and a soda solution containing 600 g./l. is obtained; the yield is then 50%. The situation does not remain static but develops, with the voltage rising to 6 volts while the soda concentration increases. It becomes impossible to continue the experiment.

COMPARATIVE EXAMPLE 1b

The same cell as in Example 1a, above, with the same membrane is supplied with the same brine at 170 ml./h. Water is added to keep the soda concentration at 420 g./l. in the effluent solution. The voltage is 5.2 volts. The faradaic yield is 65–66%. If the same test is carried out with the same brine introduced at a rate of 270 ml./h. to obtain the same soda solution, the yield is 64% for a voltage of 4.9 volts.

It should be noted that in the above two comparative examples, it is not possible to keep all the parameters constant. To make the comparison meaningful, the soda content of the effluent solution was kept constant in the above example and equal to that in Example 1. Example 1b corresponds to the best results which could be obtained by the inventors of the new diaphragm using ion exchange membranes alone. It will be observed that the yield is less than that obtained by using the diaphragm according to the invention to obtain the same concentration of soda. It should also be pointed out that, if a highly concentrated sodium solution is to be obtained, it is necessary to maintain a high concentration of NaCl and thus a high anolyte flow rate; voltage then increases and the yield is reduced (see Example 1a).

EXAMPLE 2

An experiment similar to that of Example 1 is carried out with the microporous layer, which is similar but 2.2 mm. thick, arranged on the cathode side. Brine, at the same concentration as before, is fed in at 170 ml./hr. Under normal working conditions, which are obtained after 72 hours' running, the potential difference is 5.3 volts and a solution containing 660 g./l. of NaOH is obtained, that is to say, with a yield of 60–61%.

EXAMPLE 3

An electrolytic cell similar to that described in Example 1 is used, but the composite diaphragm comprises a membrane (NAFION XR 315) with percolating membranes as described in Example 1 with a thickness of 2.2 mm. joined to both surfaces.

The cell is supplied with brine containing 295 g./l. of NaCl at a flow rate of 350 ml./h. It rapidly reaches normal working equilibrium; the voltage is then 4.7 volts. A 500 g./l. soda solution is collected (36% by weight) after 48 hours; the yield is 72–73%.

It will be noted that the yield is of the same order as that in Example 1, but that the concentration of the solution obtained is substantially higher while the additional resistance, due to the second diaphragm and the increase in thickness, is negligible.

EXAMPLE 4

The experiment described in Example 3 is repeated, but the thickness of the microporous layers joined to each surface of the ion exchange membrane is reduced to 0.9 mm.

When brine containing 295 g./l. of NaCl is introduced at a flow rate of 270 ml./h., the following equilibria are observed:

when the soda is at a concentration of 380 g./l., voltage is 4.1 volts and the yield is 80%, when the soda is at a concentration of 500 g./l., voltage is 4.2 volts and the yield is 72–73%.

When compared with the results from Example 3, these results show that the reduction in the thickness of the microporous layers enables the voltage in the electrolytic cell to be substantially reduced without producing any serious reduction in yield.

Compared with experiment 1b, this example shows the importance of the microporous layers joined to at least one surface of a selective (permselective) membrane. They improve not only the yield of the selective layer but also its conductivity during electrolysis.

EXAMPLE 5

The experiment in Example 1 is reproduced with a microporous layer of greater porosity. For this purpose, the weight of calcium carbonate used for the preparation of the layer is doubled (10 parts instead of 5 in the composition of Example 1).

During electrolysis for a soda content of 330 g./l., voltage is 4.2 volts and the yield is 82%, for a soda content of 420 g./l., voltage is 4.4 volts and the yield is 74%.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A selective diaphragm for an electrolytic cell comprising an ion-exchange, permselective, water-insoluble polymeric membrane having a microporous layer of highly homogeneous porosity intimately adherent to at least one surface of said membrane, said ion-exchange, permselective, water-insoluble polymeric membrane having ion-exchanging radicals and being selected from the class consisting of cation-exchange membranes and anion-exchange membranes and said microporous layer having pores having hydraulic diameters of between about 0.1 and 30 microns.

2. A diaphragm according to claim 1, wherein a cation-exchange membrane has intimately adherent to it at least one microporous layer of a thickness at least equal to the thickness of the membrane.

3. A diaphragm according to claim 1, wherein the microporous layer has a porosity of from about 0.05 to 0.95:1.

4. A diaphragm according to claim 1, wherein the microporous layer has a porosity of from about 0.07 to 0.9:1.

5. A diaphragm according to claim 1, wherein the hydraulic diameter of the pores of the microporous layer is from about 0.2 to 5 microns.

6. A diaphragm according to claim 1, wherein the microporous layer is adherent to the cathode compartment side of said membrane.

7. A diaphragm according to claim 1, wherein the microporous layer is adherent to the anode compartment side of said membrane.

8. A diaphragm according to claim 1, wherein a microporous layer is adhered to at each side of the membrane.

9. A diaphragm according to claim 1, wherein the cation-exchange layer comprises a sulphonated fluorocarbon copolymer.

10. A method of electrolysing a sodium chloride solution, characterized in that it is conducted in an electrolytic cell equipped with anodes and cathodes and employing a selective diaphragm according to claim 1 between each anode and cathode.

11. An electrolytic cell for the electrolysis of sodium chloride solutions and equipped with anodes and cathodes and anode compartments and cathode compartments having between the anode and cathode compartments of the cell, a selective diaphragm according to claim 1.

12. An electrolytic cell for the electrolysis of sodium chloride solutions and equipped with anodes and cathodes and anode compartments and cathode compartments having between the anode and cathode compartments of the cell, a selective diaphragm according to claim 2.

13. An electrolytic cell for the electrolysis of sodium chloride solutions and equipped with anodes and cathodes and anode compartments and cathode compartments having between the anode and cathode compartments of the cell, a selective diaphragm according to claim 6.

14. An electrolytic cell for the electrolysis of sodium chloride solutions and equipped with anodes and cathodes and anode compartments and cathode compartments having between the anode and cathode compartments of the cell, a selective diaphragm according to claim 7.

15. An electrolytic cell for the electrolysis of sodium chloride solutions and equipped with anodes and cathodes and anode compartments and cathode compartments having between the anode and cathode compartments of the cell, a selective diaphragm according to claim 8.

* * * * *

UNITED STATES PATENT AND TRADEMARK OFFICE
CERTIFICATE OF CORRECTION

PATENT NO. : 4,135,996
DATED : January 23, 1979
INVENTOR(S) : Pierre Bouy et al.

It is certified that error appears in the above-identified patent and that said Letters Patent are hereby corrected as shown below:

Col. 2, line 55, after "Pat. No. 4,031,041," insert

-- granted June 21, 1977, --

Col. 2, line 57, delete "and".

Signed and Sealed this

Fifteenth Day of May 1979

[SEAL]

Attest:

RUTH C. MASON
Attesting Officer

DONALD W. BANNER
Commissioner of Patents and Trademarks